APPARATUS AND METHOD FOR DETERMINING THE CONDITION OF PROTECTIVE COATINGS
Filed July 13, 1959
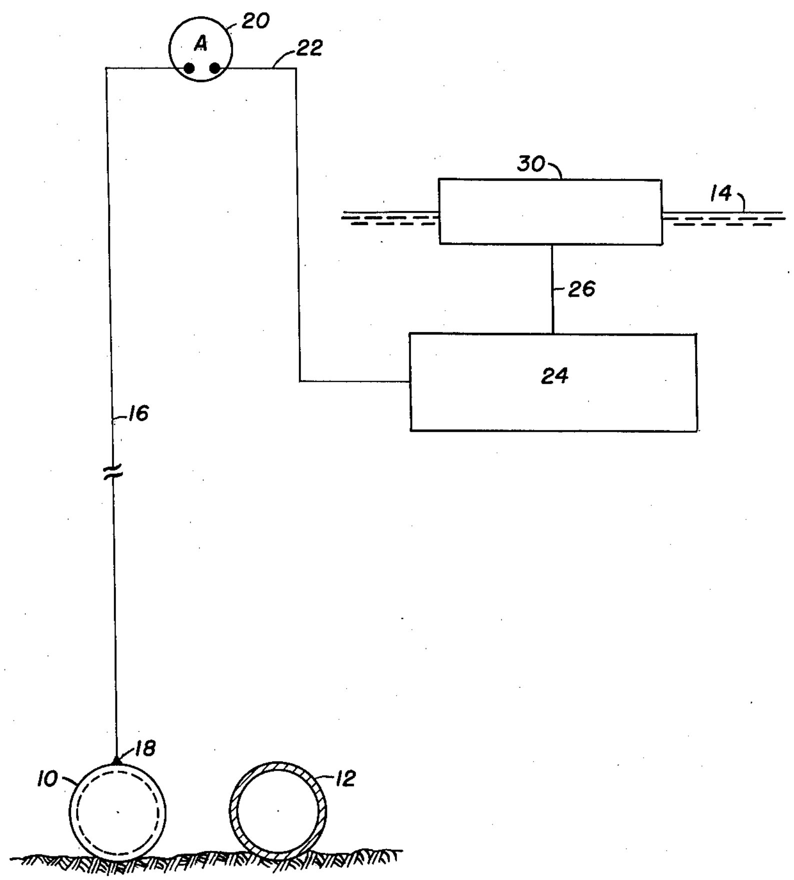
INVENTORS
GLENN A. MARSH
EDWARD SCHASCHL
BY Edward H Lang
ATTORNEY United States Patent Office 3,066,082

Patented Nov. 27, 1962

3,066,082

APPARATUS AND METHOD FOR DETERMINING THE CONDITION OF PROTECTIVE COATINGS

Glenn A. Marsh and Edward Schaschl, Crystal Lake, Ill., assignors to The Pure Oil Company, Chicago, Ill., a corporation of Ohio Filed July 13, 1959, Ser. No. 826,508
7 Claims. (Cl. 204—1)

This invention relates to a method and apparatus for monitoring the extent of deterioration of protective coatings on submerged metallic structures, such as underwater pipe-lines. More particularly, the invention is concerned with a method of determining electrically the condition of a corrosion-preventing coating placed on a corrodible test specimen.

The corrosion protection provided by protective coatings applied to submerged pipe-lines frequently diminishes over long periods of time because the coating substance gradually deteriorates, water leaks through the coating and causes a loss of adhesion, and the coating is penetrated by teredos, barnacles, or other marine organisms. Pipe-lines are often constructed across large bodies of water, where they rest on the bottom or are burried in the mud. The water often contains a sufficiently high concentration of dissolved salts to provide an excellent electrolyte. After the coated pipes have been installed, they can be inspected only by raising them to the surface, or by sending a diver down to them. In addition to being prohibitively costly in most instances, these methods are generally inadequate because visual inspection is only partially effective in determining the presence or absence of small areas of coating failure. It is desirable to know when the coating starts to fail in order that remedial countermeasures can be taken.

It is an object of this invention to provide an apparatus for determining the extent of deterioration of the protective coatings on submerged, corrodible structures.

It is another object of this invention to provide an apparatus by which the condition of the coating on a corrodible, cathodically-protected, submerged structure can be accurately estimated. Yet another object of this invention is to provide a method for determining the extent of deterioration of a protective coating on a corrodible, cathodically protected, submerged structure.

Briefly, the method of this invention comprises disposing a coated test specimen adjacent to the cathodically-protected, coated structure, disposing a second uncoated specimen within the body of water but adjacent to the air-to-water surface thereof, electrically connecting the two specimens and measuring the rate of flow of current therebetween. The test specimen is preferably fabricated from the same material as is the cathodically-protected structure, and the protective coating applied to the test specimen should be identical with the protective coating applied to the cathodically-protected structure.

The apparatus of this invention is depicted schematically in the drawing. Steel specimen 10 is positioned adjacent to pipe-line 12, preferably at a depth greater than 20 feet below surface 14 of the water. Specimen 10, fabricated from the same material as pipe-line 12, is preferably a section of the same pipe from which the pipe-line is constructed. The ends of the specimen are plugged and sealed to prevent the entry of water. The specimen and pipe-line have identical corrosion-preventing coatings. Specimen 10 can be filled with concrete or other solid to prevent it from floating. The surface area of the specimen is not critical, but most accurate results are obtained if the area is greater than 5 square feet.

Insulated, electrically-conductive cable 16 is welded or otherwise fastened to specimen 10 at connection 18, connection 18 being thoroughly insulated and protected against the entrance of water. Cable 16 may be clamped to any suitable support, such as an off-shore drilling platform, and supports specimen 10 at the desired depth. Alternatively, specimen 10 may rest on the bottom of the water, or be buried in the mud which underlies the water. The test specimen is preferably located near and in the same environment as the pipe-line. Thus, if the pipe-line is buried in the mud at the bottom of the water, the specimen is preferably buried in the mud at the same depth as and adjacent to the pipe-line.

The upper terminal of cable 16 is connected to the negative terminal of ammeter 20. Preferably, ammeter 20 has a range of zero to 100 microamperes, with auxiliary shunts and switching arrangements for selecting higher current ranges. The positive terminal of ammeter 20 is connected through cable 22 to cathodic specimen 24, which is a panel made of any material cathodic to steel when the panel is disposed in aerated water. Preferred materials are those which have low corrosion rates in water, such as Monel metal and aluminum-bronze alloys. Cathodic specimen 24 preferably has a surface area equal to the surface area of coated specimen 10, but the area of the cathodic specimen can be varied over a wide range without significant effect on the results obtained.

Cathodic specimen 24 is not coated, and cable 22 may be left bare, especially if it is made of the same material as specimen 24. If the cable and the specimen are of a different metal, it is preferred to insulate the cable. Specimen 24 is disposed in the highly agitated, aerated zone of water just beneath the surface of the water. The specimen may be conveniently supported by means of rope 26 which is attached to buoy 30.

In operation, meter 20 indicates no current as long as the coating protects the surface of specimen 10, but when the coating starts to deteriorate, the meter indicates a positive deflection because of the effects of the oxygen-concentration cell produced between the deeply submerged, coated, steel specimen and the cathodic specimen located in aerated water. Because the coated specimen initially is identical to the pipe-line under surveillance, and is positioned in the same environment as the pipe-line, it is apparent that the condition of the coating on the pipe-line is much the same as the condition of the coating on the specimen. Thus, if the condition of the coating on the specimen is known, the condition of the coating on the pipe-line may be inferred.

So long as the surface of specimen 10 is completely protected by the coating, no current will flow. As the coating deteriorates or becomes disrupted, small areas of the surface of the specimen will be bared and contacted by the water. A current will then flow, and this current will have a magnitude proportional to the sum of the areas of the bare spots. As the coating continues to deteriorate, the total bared area will increase, and so also will the current measured by ammeter 20 increase. Thus, the current measured by ammeter 20 is quantitatively related to the extent of failure of the coating. Correlation between current flow and coating failure may be obtained if desired by occasionally raising the test specimen and inspecting the coating thereon by visual or other means. In any case, rapid changes of coating condition, as are sometimes caused by action of marine bores, are immediately signalled by a rapid increase in current flow.

It is necessary to provide a test specimen, such as specimen 10, rather than to connect the ammeter directly to the pipe-line. The pipe-line is generally under cathodic protection and the effects of the cathodic protection current complicate the interpretation of the readings obtained on the ammeter. Moreover, the pipe-line, which may be many miles long, may have a number of very small bare places over its length which individually may not seriously affect the protection afforded by the coating, but which collectively might indicate a failure of the coating on the pipe-line. Another reason for not using the pipe-line itself is that it is desired to avoid making connections to the pipe-line because such connections are frequently points of coating failure.

It is known that agitated water at and near the surface of a body of water almost always contains a high concentration of dissolved oxygen. Deep water, that is, water at depths of 20 feet or more, is usually static and contains less dissolved oxygen. We have found that conditions of agitation and aeration at the cathode have a pronounced effect upon the current in galvanic couples. The galvanic currents produced by couples of various metals under varying conditions of aeration and agitation are shown in Table I. In each example the first metal listed is cathodic and the second is anodic; that is, the second metal electrode is the one which corrodes.

TABLE I

*Galvanic Cell Current*

| Couple | Aerated | | Deaerated | |
|---|---|---|---|---|
| | Static | Agitated | Static | Agitated |
| Steel-zinc | 66 | 400 | 6 | 10 |
| Steel-aluminum | 30 | 500 | 7 | 5 |
| Copper-steel | 35 | 270 | 7 | 15 |
| Brass-steel | 35 | 150 | 8 | ---------- |
| Monel-steel | 22 | 90 | 2 | 6 |
| 18-8SS-steel | 24 | 160 | 7 | 13 |
| Aluminum-zinc | 7.5 | 100 | 2 | *7 |
| Copper-18-8SS | 7.0 | 6.0 | 2 | 3 |
| 18-8SS-monel | 2 | *2 | 0 | 0 |

It should be noted that in the cases of the two currents marked with asterisks, the direction of current flow was reversed; that is, the electrode which had been the anode became the cathode, and vice versa. In each case the current density is expressed in terms of milliamperes per square foot.

Considering the case of the Monel-steel couple, it can be seen that the current density is extremely small when the couple is under deaerated, static conditions. For the reasons previously explained, it is preferable that the coated test specimen be disposed adjacent to the pipe-line or other coated metallic structure which is under study. If the cathodic specimen were located adjacent to the coated specimen, that is, at or near the bottom of the body of water, deaerated, static conditions would prevail and very little current flow even when the coating on the test specimen became substantially deteriorated. If the cathodic specimen is located near the surface of the water, as taught by the method of this invention, it is in an area which is agitated and aerated. Since it is the conditions of agitation and aeration at the cathodic electrode which control the rate of current flow, a deterioration of the coating of the test specimen results in a substantial current flow.

Because the concentration of dissolved oxygen at the surface of the cathode controls the galvanic current of a cell, anything that increases the amount of oxygen reaching the cathodic surface increases the rate of the corrosion reaction. Examples of factors influencing the diffusion of oxygen are agitation, temperature, and aeration. It is evident that the galvanic current cannot flow if the anodic surface is perfectly coated. It is necessary that the cathode specimen be disposed adjacent to the surface of the water, preferably at a depth of not greater than 5 feet, so that if the coating on the pipe-line becomes disrupted, galvanic current will flow.

It is desirable that a substantial electric potential difference exist between the coated test specimen and the cathodic specimen. This potential is the driving force which produces the galvanic current. Table II shows the results of experiments conducted to determine the open-circuit potentials of metal electrodes and aerated and deaerated salt solutions. The potentials were obtained by comparing the open-circuit potential of the metal with that of a saturated calomel half-cell.

TABLE II

*Open-Circuit Potentials of Metals of Aerated and Deaerated Salt Solutions*

| Metal | Open-circuit potential vs. sat'd. calomel half-cell | | | |
|---|---|---|---|---|
| | Aerated | | Deaerated | |
| | Static | Agitated | Static | Agitated |
| Zinc | −1.07 | −1.05 | −1.06 | −1.08 |
| Aluminum | −0.73 | −0.73 | −0.94 | −1.14 |
| Steel | −0.60 | −0.52 | −0.73 | −0.74 |
| Brass | −0.19 | −0.25 | ---------- | ---------- |
| Copper | −0.18 | −0.17 | −0.28 | −0.27 |
| Monel | −0.16 | −0.27 | −0.64 | −0.62 |
| 18-8 stainless steel | −0.2 | −0.2 | −0.35 | −0.40 |

It can be seen that the potential of a Monel electrode is less negative under aerated conditions than the potential of steel under deaerated conditions.

What is claimed is:

1. A method for determining the effectiveness of a corrosion-protection coating on a corrodible, cathodically-protected structure deeply submerged in a body of water comprising, disposing near said structure a test specimen having an exterior surface composed of the same material as said structure, and having a corrosion-protection coating substantially identical with the coating on said structure, disposing a second specimen composed of a material cathodic to said test specimen in said body of water adjacent to the surface thereof, and measuring the flow of current between said specimens.

2. A method according to claim 1 in which said test specimen is disposed at a depth of at least 20 feet beneath the surface of said body of water, and said second element is disposed at a depth of not more than 5 feet beneath the surface of the water.

3. A method according to claim 1 in which said test specimen is disposed in the subsoil underlying said body of water.

4. An apparatus for determining the condition of a corrosion-protection coating on a corrodible test specimen comprising a corrodible, coated test specimen disposed in a body of water at a depth of at least 20 feet below the air-to-water surface thereof, *a* second uncoated specimen composed of a material cathodic to said test specimen disposed in said body of water at a depth not greater than 5 feet below the surface thereof, means for measuring the magnitude of flow of an electric current, and electrical conductors connecting said means in series with said specimens.

5. An apparatus according to claim 4 in which said conductors are covered with an electrically-insulating material.

6. An apparatus according to claim 4 in which said second specimen is fabricated from a material not readily corroded by aerated salt water.

7. An apparatus according to claim 6 in which said test specimen is composed of steel and said second specimen is composed of Monel metal.

References Cited in the file of this patent

UNITED STATES PATENTS

| | | |
|---|---|---|
| 1,845,231 | Browning | Feb. 16, 1932 |
| 2,374,088 | Fontana et al. | Apr. 17, 1945 |
| 2,803,797 | Cowles | Aug. 20, 1957 |

OTHER REFERENCES

"Underground Corrosion," Not. Bur. of Stan. Circular 579, April 1957, pages 9–13.